(12) United States Patent
He

(10) Patent No.: US 7,898,705 B2
(45) Date of Patent: Mar. 1, 2011

(54) COLOR STATUS DETECTION IN COLOR BINARY DOMAIN

(75) Inventor: Zhen He, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 920 days.

(21) Appl. No.: 11/537,032

(22) Filed: Sep. 29, 2006

(65) Prior Publication Data

US 2008/0079967 A1    Apr. 3, 2008

(51) Int. Cl.
  *G06F 3/12* (2006.01)
  *H04N 1/46* (2006.01)
  *G03F 3/08* (2006.01)
(52) U.S. Cl. .................. 358/518; 358/1.15; 358/515
(58) Field of Classification Search .............. 358/1.9, 358/3.06, 3.07, 3.08, 515, 530, 518, 1.14–1.18, 358/500, 504, 540
  See application file for complete search history.

(56) References Cited

U.S. PATENT DOCUMENTS

| | | | |
|---|---|---|---|
| 5,282,026 A | | 1/1994 | Nagata |
| 5,287,204 A | * | 2/1994 | Koizumi et al. ............. 358/538 |
| 5,748,802 A | * | 5/1998 | Winkelman .................. 382/271 |
| 6,249,592 B1 | | 6/2001 | Fan et al. |
| 6,580,825 B2 | * | 6/2003 | Bhaskar ...................... 382/169 |
| 7,667,870 B1 | * | 2/2010 | Walton ........................ 358/1.9 |
| 2002/0135787 A1 | * | 9/2002 | Smith et al. .................. 358/1.1 |
| 2003/0206307 A1 | * | 11/2003 | Handley et al. .............. 358/1.9 |
| 2006/0247938 A1 | * | 11/2006 | Thieret .......................... 705/1 |

* cited by examiner

*Primary Examiner*—James A Thompson
(74) *Attorney, Agent, or Firm*—Marger Johnson & McCollom, P.C.

(57) ABSTRACT

A method to determine the color status of a scanned original segments a binary halftone image into a predetermined number of local windows and converts each local window to a device-independent color space. The method then determines a color space parameter for each local window and compares the color space parameters for the local windows to at least one threshold to determine the color status of the scanned original. An apparatus having a scanner creates a scanned image of an original and has at least one processor to create a binary halftone image from the scanned image, segment the binary halftone image into a predetermined number of local windows, convert each local window to a device-independent color space, determine a color space parameter for each local window, and compare the color space parameter for each local window to at least one threshold to determine the color status for the scanned original.

15 Claims, 4 Drawing Sheets

COLOR STATUS DETECTION IN COLOR BINARY DOMAIN

BACKGROUND

The billing meter of a color multi-function peripheral (MFP) charges different per-page rates for black and white and color copies. The MFP generally decides based upon whether the original is color or black and white. A black-white detection algorithm typically uses a color feature recognition to make the classification, such as non-neutral color, color edge, etc. Usually, this detection occurs in device-independent color space on the continuous tone color scan image.

In some instances, the system only has the binary halftone bitmap of the image available as the input to the black-white detection algorithm. This may occur because the processor in the image path does not have the black-white detection process built in to it. The system may also lack sufficient memory space to save the continuous-tone image. Determining the color or black and white status of a page becomes more difficult in the binary halftone image.

This difficulty may result from the binary bitmap including a mixture of CMYK (cyan magenta yellow black), even for an original page perceived as black and white page at viewing distance. For example, the scan image may not have exact color neutrality, even after scanner color calibration, because the scanner color response varies for the originals from different print technologies. Additionally, the printer engine may mix color (CMY) dots with black dots to enhance contrast and black and white text quality. The resulting issue lies in the use of color dots to render the near-neutral colors when the image converts to CMYK space from the scanner RGB space.

Another difficulty may arise from the device dependency of binary halftone images. Generally, no simply analytic transform exists to convert the binary halftone images back to device-independent color space, such as L*a*b, or other standardized color space. The conversion may need a four-dimensional look up table (LUT) for high color accuracy, adding significant memory overhead.

In addition, the conversion process may require several four-dimensional LUTs. For example, the device may use different conversions from L*a*b or other device-independent color space to the halftone binary image. Text mode may use one table, photo mode another table, with each mode requiring a different table. In some cases, the system may not have the capability to access the right LUT because of inaccessibility of the copy output intent information. Further, the bit depth decimation from 8 bit separation to 1 bit separation causes a significant loss of image information.

All of these factors combine to raise the difficulty of robust detection of a black and white page in the binary domain.

SUMMARY

One embodiment is a method of determining color status of a scanned original. The method segments a binary halftone image into a predetermined number of local windows and converts each local window to a device-independent color space. The method then determines a color space parameter for each local window and compares the color space parameters for the local windows to at least one threshold to determine the color status of the scanned original.

Another embodiment is an apparatus having a scanner to create a scanned image of an original. The apparatus has at least one processor to create a binary halftone image from the scanned image, segment the binary halftone image into a predetermined number of local windows, convert each local window to a device-independent color space, determine a color space parameter for each local window, and compare the color space parameter for each local window to at least one threshold to determine the color status for the scanned original.

DETAILED DESCRIPTION

Figure 1:
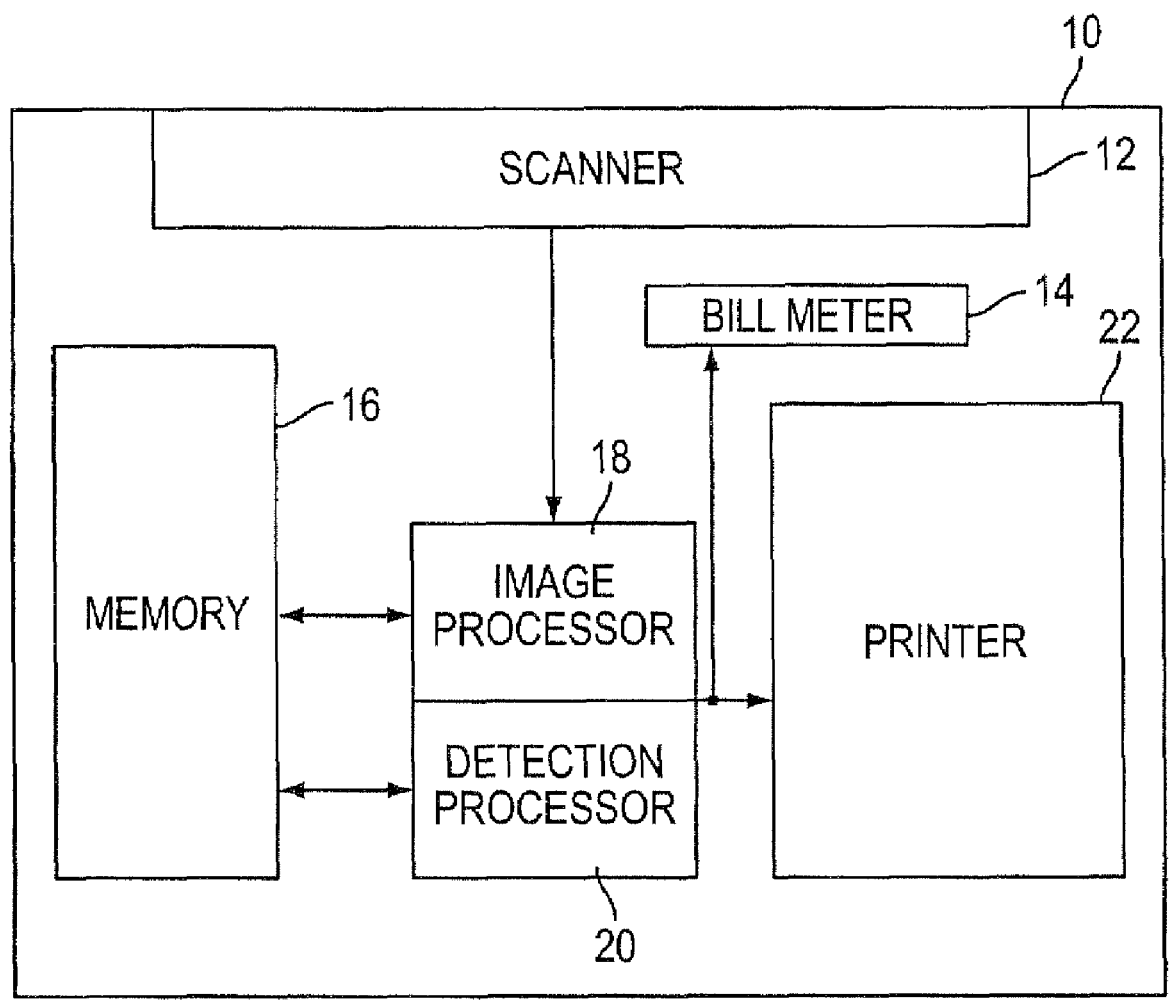
FIG. 1 shows a block diagram of a multifunction peripheral.

FIG. 1 shows a block diagram of a multifunction peripheral (MFP) or multifunction device (MFD). The term 'multifunction' generally refers to the device capabilities of print, copy, fax and scan. Generally, these devices also include a network connection, either a local area connection (LAN) such as an Ethernet interface, or a modem that can connect to a phone line, not shown here.

The example MFP 10 includes a scanner 12, a billing meter 14, at least one processor such as 18 and 20, a memory 16 and a printer 22. The scanner allows the device to scan hard copy originals and either save the image in memory, produce a printed copy of the original, or both. One must note that the printer 22 produces hard copy output, whether from a print request, a copy request, or a received fax, the term printer does not limit it to just print requests.

In operation a user places an original in the scanner and the MFP scans the original. The scanner generally employs Red-Green-Blue (RGB) input colors to produce the scanned original. The scanner then transmits the RGB data, referred to here as the scanned original, to the image processor 18. The image processor 18 may also include the functions of the detection processor 20, discussed with regard to FIG. 2. The scanner or the processor may store the scanned original in the memory 16. The detection processor 20 makes the determination as to the color status of the scanned original. This determination then triggers a particular rate in the billing meter. An incorrect determination may result in a color copy, charging the customer a higher color rate for what should have been a black and white copy.

Figure 2:
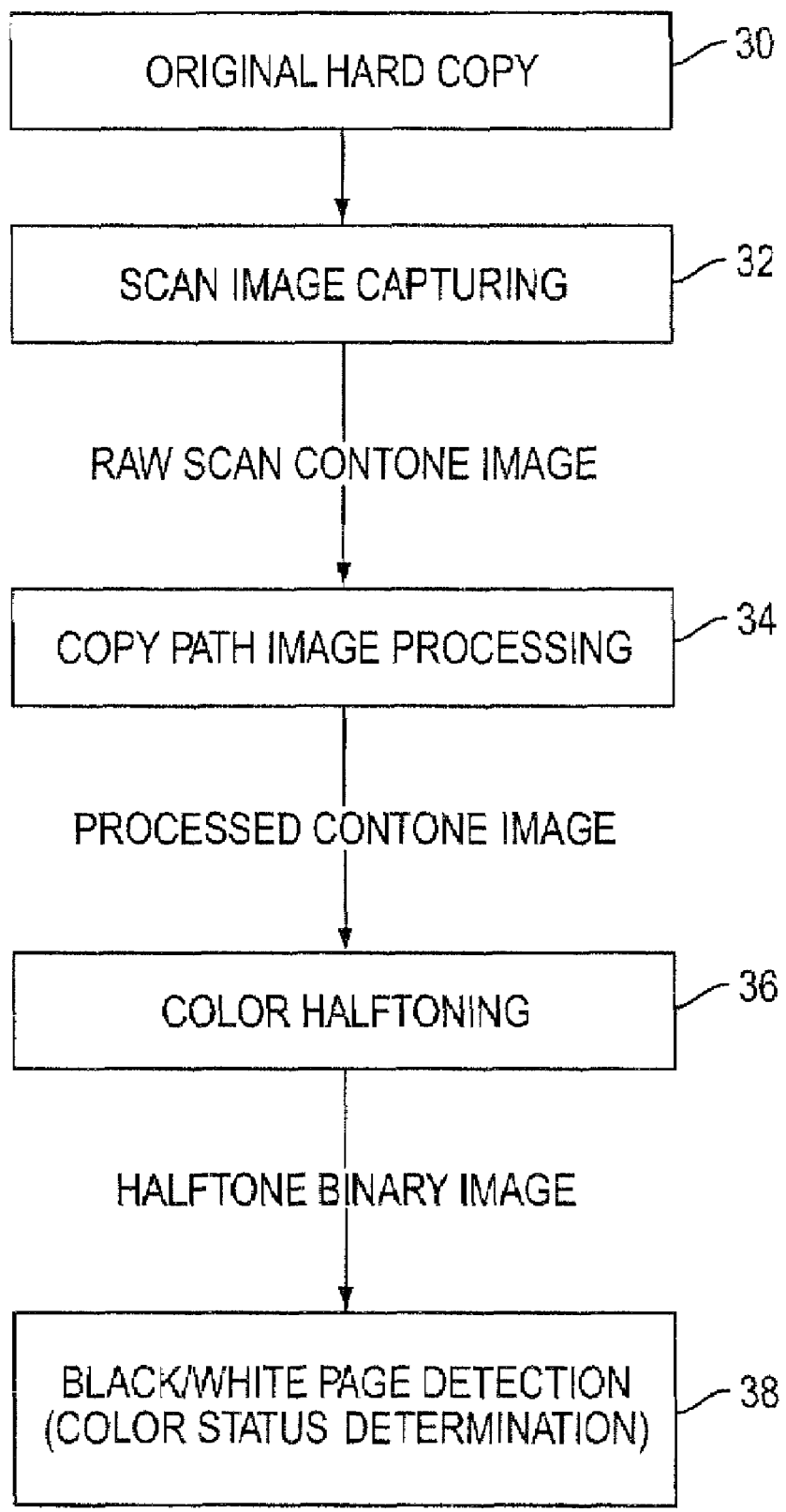
FIG. 2 shows a flowchart of a process for scan image output conversion.

FIG. 2 shows an example of scanned original processing. At 30, the process begins with the original hard copy original. The original may contain text, photos, graphics or a mix of all three. The scanner captures the image at 32, resulting in a raw scan continuous tone (contone) image, generally in RGB data. The image processor will then perform copy path image processing at 34, such as image enhancement, etc. This results in a processed contone image.

The system then converts the processed contone image to a halftoned binary image at 36. This process at 36 will generally include color conversion from an intermediate color space such as CIEL*a*b* color space, to cyan-magenta-yellow-black (CMYK) data. This binary bitmap will then become the input to the black-white detection process 38. This discussion may also refer to the black-white (BW) detection process as 'color status' or 'color status determination,' since the process classifies the original as black-white or color.

To improve the accuracy of BW original detection, the page original detection should rely on the local color estimation from binary CMYK data. FIG. 2 shows a flowchart of one embodiment of this local color estimation. At 40, the process segments the binary halftone image into N pixel by N pixel local windows. Some overlapping among adjacent windows may result in more accurate detection, at the price of heavier per-pixel computation load. The sizing of the window has a tradeoff between accuracy of average color estimation and local color feature detectability, such as small color fonts.

For each window, the process counts the CMYK dots separately at 42. If at least the count of one channel, C M Y or K, is greater than the minimum dot count condition $C_{min}$, the process computes the dot coverage percentage $P_i$ i={c, m, y, k} of each CMYK channel by dividing by $N^2$. Otherwise, the process ignores this window. The process sets $C_{min}$ to exclude the white area and extreme highlight area that may be caused by artificial background dots when computing the histogram later. The dot coverage percentage, $P_i$, is used to estimate the average color of the original page within the local window at 44.

The can lead to at least one problem. The process does not know the underneath gray component replacement (GCR) applied for this original. Gray component replacement occurs when black is used to replace CMY dots used in the neutral color areas. The system does not have the inverse four-dimensional LUT which maps CMYK to, say, CIEL*a*b* or other device-independent color space. However, the process does not necessarily need accurate color estimate for all the color in the gamut. A reasonable estimate of the color around the neutral gray axis may suffice.

To get around of the problem of unknown GCR, some modeling of the interaction between CMYK dots may assist in the estimation for a given halftoning algorithm. There are many color-mixing models of different accuracy and complexity. Since this system does not require the highest accuracy, the process may use a simple, measurement-based model for fast computation. First, the process finds the triple {c, m, y} to achieve a given neutral gray level, gl=r=g=b, gl∈[0,1]. Assume 0 is black and 1 is white. The process denotes the gray level, gl=f(c, m, y). One can observe that, along neutral axis, gl can be specified equivalently with c, m or y as the unique variable. This results in gl=$f_1$(c)=$f_2$(m)=$f_3$(y). Ideally, it would result in r=1−c; g=1−m; b=1−y. This shows a strong correlation between R and C, G and M, B and Y. Therefore, it is reasonable to approximate the color around the neutral gray axis as r≈$f_1$(c); g≈$f_2$(m); b≈$f_3$(y).

One can also find the black ink K value to achieve a given neutral gray level gl as gl=$f_4$(k). With the assumption of channel K and CMY channels, it results in the following approximation:

$$R=f_1(c) \cdot f_4(k)$$

$$G=f_2(n) \cdot f_4(k)$$

$$B=f_3(y) \cdot f_4(k)$$

The process then converts the RGB estimate for each window to CIEXYZ at 46 and then to CIEL*a*b* at 48. CIEXYZ is sometimes also referred to as the CIE 1931 color space. The process can use any device-independent color space. The binary halftoned image resulting from the scanned original may have device-dependent characteristics. Using a device-independent color space removes device dependencies that may cause an inaccurate color result, in turn causing an inaccurate detection. While the current example uses CIE XYZ and CIE L*a*b, any device-independent color space may suffice. Further, a process of converting the local windows to the device-independent color space may include the individual processes 44, 46 and 48. If a different color space process does not need those processes, they may become optional.

Finally, the process computes $C_{ab}*=\sqrt{(a*)^2+(b*)^2}$, the radial distance in a*b* space at 50. As mentioned above, the current example uses a CIE XYZ to CIE L*a*b conversion, with the availability of the radial distance. Other processes using other color spaces may utilize a different parameter. The radial distance provides just one example of a color space parameter.

The scanned original color/BW classification takes $C_{ab}*$ of each local window as input. Since a customer may copy different hardcopy originals such as laser, solid ink, litho prints, photographs, etc., with different copy contents such as mixed, photo, text, and graphics, the robustness of the detection algorithm becomes a key issue. At a first stage, two pre-set thresholds are applied to classify the copy into three categories: BW, color and undecided.

If one of the $C_{ab}*$ value is greater than a high threshold $T_h$ at 52, the whole page is classified as color original. The threshold $T_h$ is set up in such a way that one 12 point font with saturated color on a page will be classified as color original. In one experiment, the process set $T_h$=19.0.

If every $C_{ab}*$ value remains less than a low threshold $T_l$ at 54, the process classifies the whole page as a BW original. The threshold $T_l$ is set up in such a way that a BW original from a typical solid-ink printer and laser printer is classified as BW original. In one experiment, the process set $T_l$=13.0. For a scanned original that does not meet these criteria, the process remains undecided and performs further analysis.

For the undecided case, the process computes the histogram of Cab at 56. In one example, this process denotes the set size of all $C_{ab}*$ as |H|. One must remember that not all of the windows of the scanned original have the color space parameter computed. Those windows with a dot count below the minimum would not have a $C_{ab}*$. The process denotes the size of the set A={$C_{ab}*$:$C_{ab}*$<$T_l$} as |A|. The parameter |A| comprises the number of windows for which the color space parameter is lower than the low threshold, or the number of windows that would otherwise result in a black and white determination. If |A|/|H|<$T_p$ at 58, the page is classified as a color original. This improves the robustness of classifying a page having much less saturated color but is still a color original. Usually $T_p$ is set to a value close to 1.0, for example, 0.85. In this particular example, then, if less than 85% of the windows are windows in which the color space parameter falls below the low threshold, the original is classified as a color original.

If the percentage of windows for which the color space parameter falls below the low threshold is more than the percentage threshold $T_p$, the process computes the mean μ and standard deviation σ a of $C_{ab}*$ histogram at 60. If there exists at least one $C_{ab}*$ value great than μ+γσ at 62, the process classifies the page as a color original. Otherwise, the process classifies it as a BW original. The multiplicative factor γ relates to the spread of the probability distribution of the histogram. A typical value is 4.0 for this application. The process wants to detect color blocks based on the probability distribution of $C_{ab}*$ of a true BW original. The BW original from different print technology has different $C_{ab}*$ probability distribution, mainly caused by the scanner's non-colorimetric response. If some $C_{ab}*$ falls into the very unlikely region of the probability distribution, a high probability exists that the page has some color contents. Examples of these histograms may increase understanding.

Figure 3:
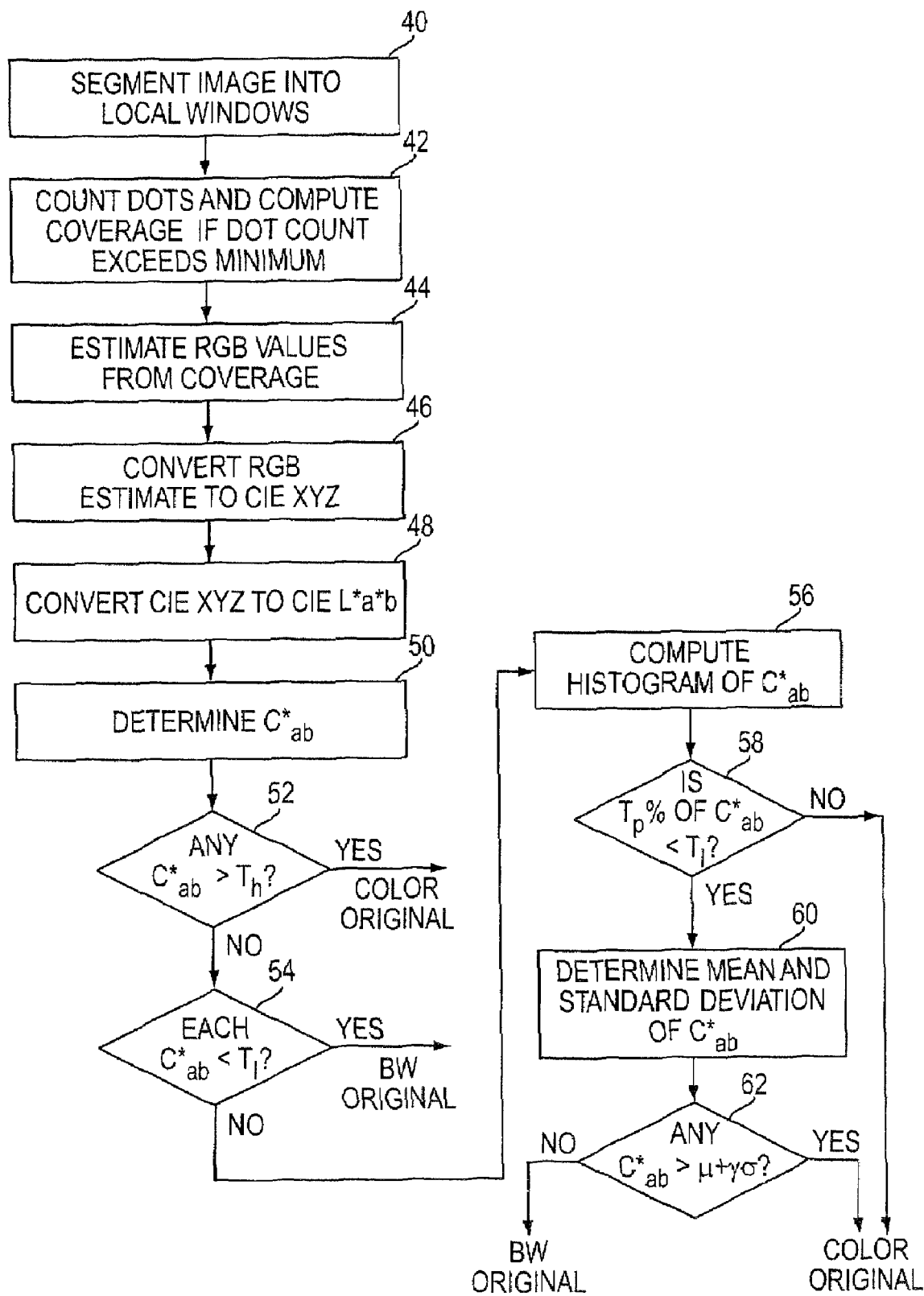
FIG. 3 shows a flowchart of an embodiment of a method to detect black and white page originals.

FIG. 3 shows an example of the normalized histogram of $C_{ab}*$ from a copy using default color copy mode. This example shows the previously-discussed high and low thresholds of 19 and 13, just for comparison. The original contains a typical mixed-content BW print using a default BW print mode. The histogram shows the distribution heavily concentrated near 0, which indicates good $C_{ab}*$ estimate. The average $C_{ab}*$ is only 2.75. All $C_{ab}*$ are less than 10. Thus, the process will classify this copy as being from a BW original.

Figure 4:
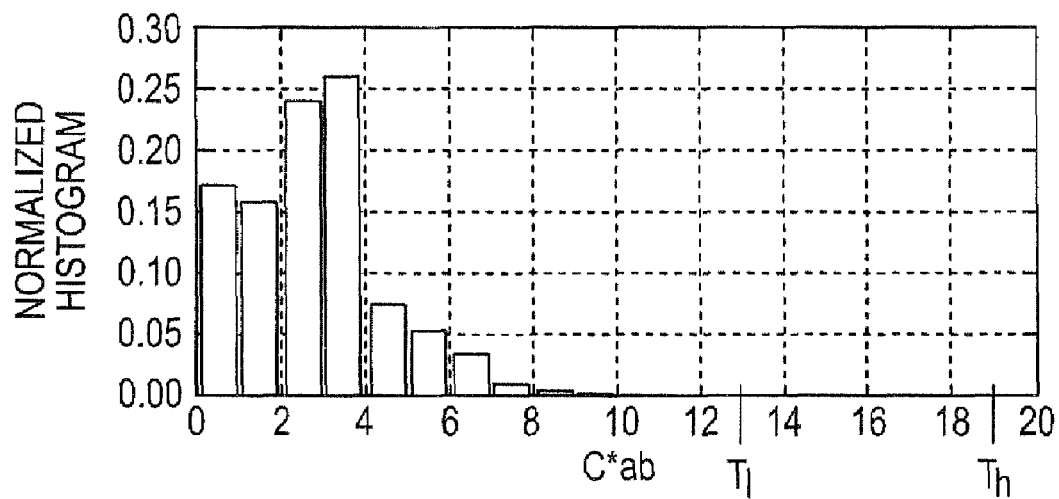
FIG. 4 shows a histogram generated during a process to detect black and white page originals using an original.
Figure 5:
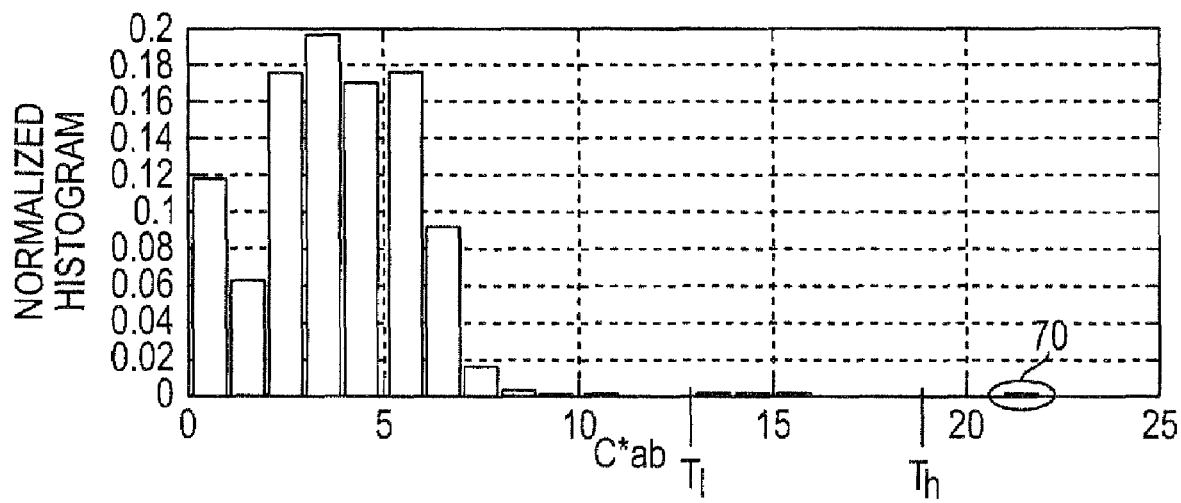
FIG. 5 shows a histogram generated during a process to detect black and white page originals using a different original.

Another example resulted from a copy of a whole text page original covered with a variety of 12 point fonts. The original contained all BW fonts, except only one blue 'o' alphabetic character. FIG. 4 shows the histogram result. The count at $C_{ab}^*$ bin 22, shown at 70, lies above the high threshold 19. Thus, the process classified it as from a color original.

In this manner, a relatively computationally fast method provides a more accurate determination of color or black and white originals for halftoned binary images. As mentioned above, the examples above provide useful understanding of the process, but should not limit the scope of the applications of the embodiments of the invention.

It will be appreciated that variety of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A method of automatically determining color status of a scanned original in a multi-function peripheral device, comprising:
   receiving, at a scanner on the multi-function peripheral device, an original document;
   scanning the original document with the scanner to produce scanned image data;
   transmitting the scanned image data to a processor;
   executing, with the processor, instructions that cause the processor to:
      segment a binary halftone image into a predetermined number of local windows;
      determine which local windows are to undergo color status processing by comparing a dot count for each channel to a predetermined minimum, wherein color status processing comprises:
         converting each local window to a device-independent color space;
         determining a color space parameter for each local window;
         comparing the color space parameters for the local windows to a predetermined threshold to determine the color status of the scanned original; and
         transmitting the color status to a billing meter; and
   setting a particular rate based upon the color status.

2. The method of claim 1, further comprising
   estimating Cyan-Magenta-Yellow-Black coverage for the local window, if the dot count exceeds the minimum count; and
   using the Cyan-Magenta-Yellow-Black coverage to estimate the color of an original page within the local window.

3. The method of claim 2, further comprising ignoring local windows in which the dot count does not exceed a minimum count prior to converting.

4. The method of claim 1, wherein segmenting the binary halftone image comprises dividing the binary halftone image into a predetermined number of windows that overlap.

5. The method of claim 1, wherein converting the local window comprises:
   estimating Red-Green-Blue values for the local window from a Cyan-Magenta-Yellow-Black coverage estimate;
   converting the Red-Green-Blue values for the local window to a CIE XYZ color space local window; and
   converting the CIE XYZ color space local window to a CIE LAB color space local window.

6. The method of claim 1, wherein determining the color space parameter comprises determining a radial distance in a CIE LAB color space.

7. The method of claim 1, wherein comparing the color space parameter to at least one predetermined threshold comprises comparing a radial distance to the predetermined threshold such that if the the radial distance exceeds the predetermined threshold, the scanned original is determined to be color.

8. The method of claim 1, wherein comparing the color space parameter to at least one threshold comprises comparing a radial distance for each local window to the predetermined threshold such that if the radial distance for each local is lower than the predetermined threshold, the scanned original is determined to be black and white.

9. The method of claim 1, further comprising:
   computing a histogram of radial distances for the local windows;
   determining a range of values for the histogram;
   classifying the scanned image as color if the radial distance for one local window is outside the range of values.

10. The method of claim 9, wherein determining a range of values comprises adding a mean for the histogram to a standard deviation multiplied by a spread factor.

11. An apparatus, comprising:
    a scanner to create a scanned image of an original;
    at least one processor to execute instructions that cause the processor to:
       create a binary halftone image from the scanned image;
       segment the binary halftone image into a predetermined number of local windows; and
       determine which local windows are to undergo further color status processing by comparing a dot count for each channel to a predetermined minimum, wherein color status processing comprises:
          converting each local window to a device-independent color space;
          determine a color space parameter for each local window; and
          comparing the color space parameter for each local window to at least one threshold to determine the color status for the scanned original; and
    a billing meter to set a particular rate based upon the color status of the scanned original.

12. The apparatus of claim 11, further comprising a printer to print an output image based upon the color status of the scanned original.

13. The apparatus of claim 12, wherein the printer comprises a xerographic printer.

14. The apparatus of claim 11, wherein the at least one processor comprises two processors, a first processor to create the binary halftone image and a second processor to segment, convert, determine and compare.

15. The apparatus of claim 14, the second processor comprising one of a digital signal processor, an application specific integrated circuit and a general purpose processor.

* * * * *